No. 825,668. PATENTED JULY 10, 1906.
R. C. LAYTON.
CAR FENDER.
APPLICATION FILED JAN. 8, 1906.
2 SHEETS—SHEET 1.
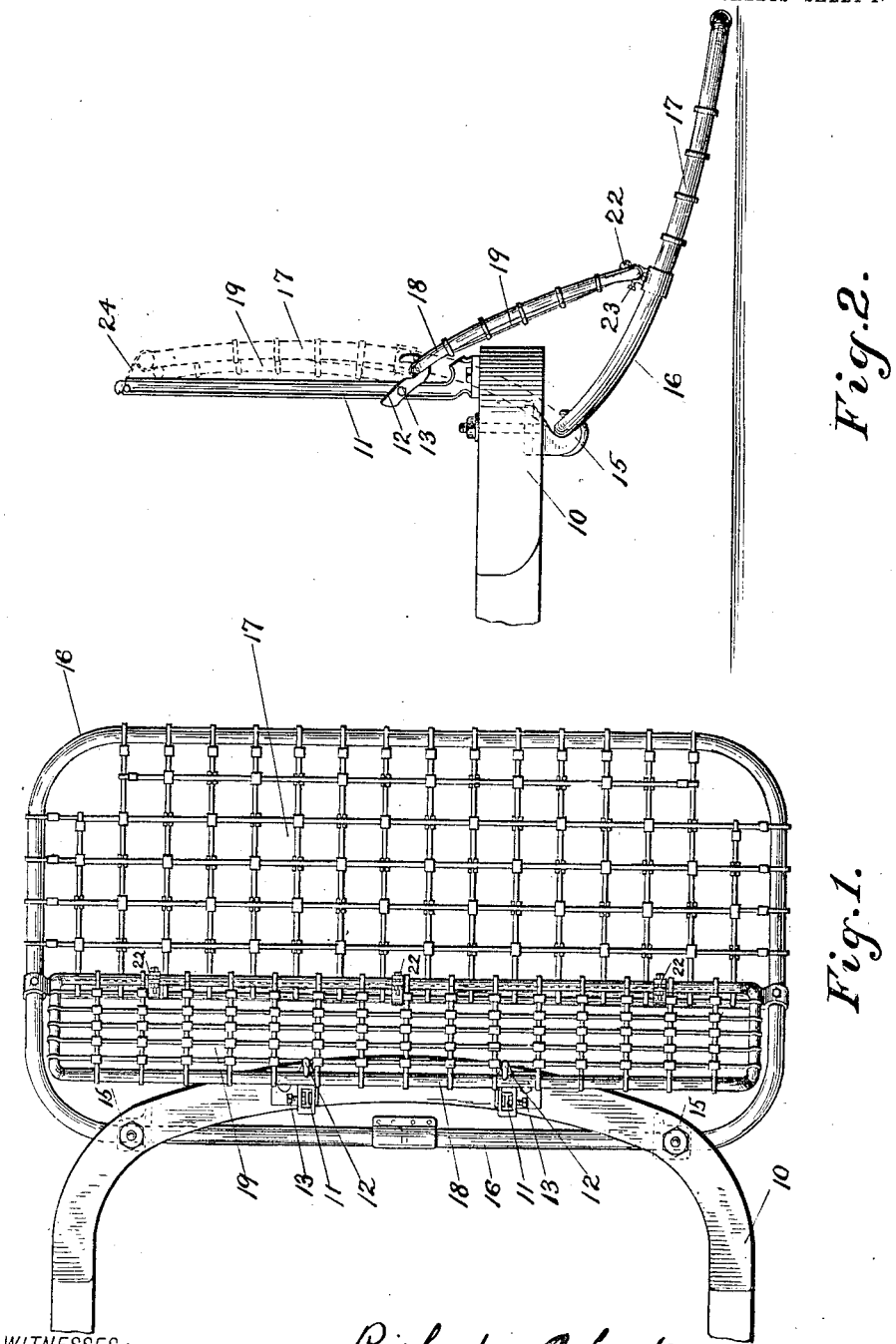
WITNESSES: Richardson C. Layton INVENTOR
BY
Fred P. Schuetz ATTORNEY No. 825,668. PATENTED JULY 10, 1906.
R. C. LAYTON.
CAR FENDER.
APPLICATION FILED JAN. 8, 1906.

2 SHEETS—SHEET 2.

Witnesses
Geo. V. Eisteman
Sally O. Mudzky

Richardson C. Layton, Inventor
By his Attorney Fred'k P. Schuster

UNITED STATES PATENT OFFICE.

RICHARDSON C. LAYTON, OF BROOKLYN, NEW YORK, ASSIGNOR TO EMPIRE PIPE BENDING & SUPPLY CO., OF BROOKLYN, NEW YORK, A CORPORATION OF NEW YORK.

CAR-FENDER.

No. 825,668.     Specification of Letters Patent.     Patented July 10, 1906.

Application filed January 8, 1906. Serial No. 295,131.

*To all whom it may concern:*

Be it known that I, RICHARDSON C. LAYTON, a citizen of the United States, and a resident of Brooklyn, in the county of Kings and State of New York, have invented certain new and useful Improvements in Car-Fenders, of which the following is a specification.

My invention has reference to improvements in car-fenders, such as disclosed in my Patent No. 785,535, of August 4, 1903, and has for its object to simplify the general arrangement, to overcome the objectionable feature of the fender therein disclosed—viz., projecting over and above the dashboard when raised—and has for its further object to facilitate the removal of the fender from the car.

For this purpose my invention consists, essentially, of a fender comprising a primary section of lattice-work and a similar supplementary section and means for adjusting the sections with respect to each other, the said sections being so arranged with respect to the car platform or bumper that they may be simultaneously removed from said bumper or be raised out of active position, folding compactly together and in such a manner that they lie completely within the line of the bumper and do not project above or beyond the upper edge of the dashboard.

The nature of my invention will be best understood in connection with the accompanying drawings, in which—

Figure 4:
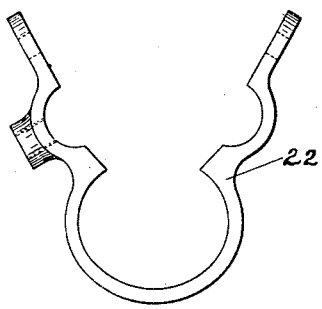
Figure 5:
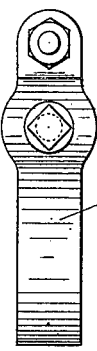
Figure 3:
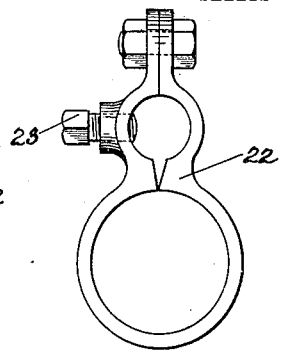
Figure 7:
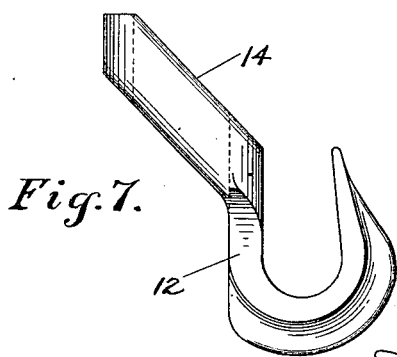
Figure 6:
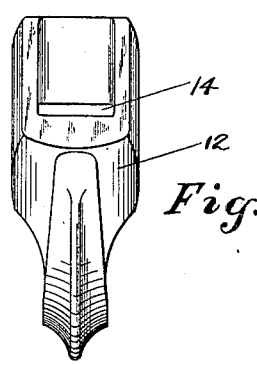
Figure 8:
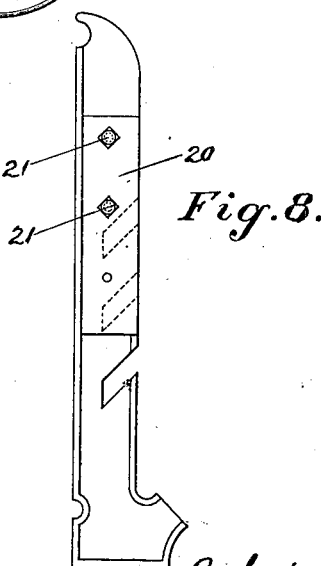

Figure 1 is a plan view of my improved fender as attached to the platform or bumper of an ordinary car. Fig. 2 is a side view of the fender in active position, the parts in raised or inactive position being shown in dotted lines. Figs. 3 to 5 are detail views of the adjusting-clamp. Figs. 6 and 7 are detail views of a supporting-hook. Fig. 8 is a view showing a modified means of supporting the supplementary section.

Similar characters of reference designate corresponding parts throughout the several views.

Referring now to the drawings, 10 designates the platform or bumper of the car, curved in the usual manner and extending in practice beyond the dashboard of the car.

Upon the platform or bumper 10 are mounted two standards or guides 11, provided with hooks 12, secured to said standards by means of the set-screws 13. These hooks (shown in detail in Figs. 6 and 7) are self-fastening, being provided with perforations 14, so that they can be slipped over the standards or guides 11 and firmly grip the same. For additional safety and security against displacement of the said hooks when removing the fender from the car I prefer to make use of the set-screws 13. To the lower or under side of the bumper 10 are secured two hangers 15. These hangers are adapted to retain the inner end of the frame-piece 16 of the primary section 17 of the fender. To prevent possibility of accidental displacement of the frame-piece 16, I may utilize any of the well-known fastening devices, such as a hook, in the reverse direction from the hanger. The frame-piece 16 is provided with a bed, such as the lattice-work, shown in the drawings; but a portion thereof at the inner end is left free of lattice-work to permit the said frame to swing over the bumper 10 of the car when raising the fender.

The hooks 12 are adapted to retain the inner end of the frame-piece 18 of the supplementary section 19 of the fender, said framework being provided with a similar lattice-work, but which is preferably made to extend over the entire frame.

In place of the hooks 12 I may substitute a notched standard, such as shown in Fig. 8, the frame-piece 18 being adapted to be slipped into the desired notch. To prevent the frame from dropping into any but the desired notch upon lowering it after it has been raised, I provide a side plate 20, made adjustable by means of bolt and nut 21, adapted to cover laterally, as shown, the notches above the desired one.

The supplementary section 19 of the fender is hinged to the primary section by means of the clamps 22 (shown in detail in Figs. 3 to 5) and is supported within the hooks 12, serving thereby, in conjunction with the primary section, to maintain the fender as a whole a predetermined distance above the ground. This distance is controlled by means of the hooks 12 or the notches in the modified form upon the standard 11. The angle between the two sections of the fender is adjusted by means of the clamp 22, one of the frame-pieces of the sections being firmly held in its bearing by means of a set-screw 23, placed either in the bearing for the supplementary section, as shown, or in the bearing for the primary section. For the purpose of readily attaching those clamps or hinges to the two frame-pieces I prefer to make them open, as shown in Fig. 4, heating them and then placing them about the two frame-pieces, and finally closing and fastening them together while hot by means of a bolt and nut, as shown in Fig. 3. The two frames or sections are then adjusted to the desired angle between them by tightening the set-screw 23.

The two sections thus form together a complete fender which may be raised and folded together in the usual manner by means of a chain 24 or other suitable means without requiring the motorman or the conductor to leave his post. The two sections fold together, as shown in dotted lines, Fig. 2, the primary section revolving about the supporting-hangers 15 and the supplementary section rising out of its supporting-hooks or notches 12, rising against the standards 11, and revolving about its hinges 22. When folded, the two sections do not project above the dashboard, present a neat appearance, and are entirely within the line of the car-bumper, so that the cars may be stored without removing the fender or may be coupled together when in service without removal or injury to the fender.

To remove the fender, it is necessary only to lift the supplementary section out of its supporting-hooks 12 or notches and fold it upon the primary section and then lift the primary section out of its supporting-hangers.

While I have shown the two sections secured to the car by means of hangers and hooks, it is evident that I may employ other equivalent means.

What I claim as new, and desire to secure by Letters Patent of the United States, is—

1. A fender for cars comprising: a standard or guide attached to the car; a primary section or frame and a supplementary section or frame, said sections being hinged together and each adapted to be removably attached to the car in such a manner that the said sections may be freely and directly folded together against said standard or guide by raising said primary section, and having the upper end of the supplementary section or frame engage the said standard or guide.

2. A fender for cars comprising: a standard or guide attached to the car; a primary section or frame and a supplementary section or frame, said sections being adjustably hinged together and each adapted to be removably attached to the car in such a manner that the said sections may be freely and directly folded together against said standard or guide by raising said primary section, and having the upper end of the supplementary section or frame engage the said standard or guide.

3. A fender for cars comprising: a standard or guide attached to the car; a primary frame partly latticed and a supplementary frame entirely latticed and adapted to cover a portion of the unlatticed part of said primary frame, said frames being adjustably hinged together and each adapted to be removably attached to the car in such a manner that the said frames may be freely and directly folded together against said standard or guide by raising said primary frame, and having the upper end of the supplementary frame engage the said standard or guide.

4. In combination with a car and a standard or guide attached thereto, a fender comprising a primary section and a supplementary section hinged thereto; means on the under side of the bumper of said car for removably attaching the primary section; and means above said bumper for removably attaching said supplementary section so that in raising said primary section, the upper end of the supplementary section is thereby directly and freely raised out of its support and engages the standard or guide, and the two said sections fold together against said car.

5. In combination with a car and a standard or guide attached thereto, a fender comprising a primary section and a supplementary section adjustably hinged thereto; means on the under side of the bumper of said car for removably attaching the primary section; and means above said bumper for removably attaching said supplementary section so that in raising said primary section, the upper end of the supplementary section is thereby directly and freely raised out of its support and engages the standard or guide, and the two said sections fold together against said car.

6. In combination with a car, a fender comprising a primary section and a supplementary section hinged thereto; hangers attached to the under side of the bumper of said car adapted to support the primary section; standards or guides fixed to the upper side of said bumper; hooks mounted upon said standards, said hooks being adapted to engage the upper end of and support the said supplementary section in such a manner that it is directly and freely lifted out of said hooks and slides upon said standards when the primary section is raised in folding said sections together against said car.

7. In combination with a car and a standard or guide attached thereto, a fender comprising a primary section or frame, and a supplementary section or frame; means to determine the angle between said sections; and means to removably attach each of said sections to said car in such a manner that the said sections may be freely and directly folded together against said standard or guide by raising said primary section, and having the upper end of said supplementary section or frame engage the said standard or guide.

8. In combination with a car and a standard or guide, a fender comprising a primary section or frame, and a supplementary section or frame; means on the under side of the bumper of said car for removably attaching the primary section; means above said bumper for removably attaching said supplementary section; and means to determine the angle between the sections, the said sections being so attached to the car that they may be freely and directly folded together against said standard or guide by raising the primary section, and having the upper end of said supplementary section or frame engage the said standard or guide.

9. In combination with a car and a standard or guide, a fender comprising a primary section or frame, and a supplementary section or frame; means on the under side of the bumper of said car for removably attaching the primary section; means above said bumper for removably attaching said supplementary section; and a clamp adapted to hinge said sections or frames together and to determine the angle between the sections, the said sections being so attached to the car that they may be freely and directly folded together against said standard or guide by raising the primary section, and having the upper end of said supplementary section or frame engage the said standard or guide.

10. In combination with a car, a fender comprising a primary section or frame, and a supplementary section or frame; a clamp adapted to hinge said sections or frames together, a set-screw in one of the bearings of said clamp adapted to secure the position of said sections and thereby determine the angle between them; and means to removably attach said fender to said car in such a manner that the said sections may be directly folded together against said car by raising said primary section.

11. In combination with a car, a fender comprising a primary section or frame; a supplementary section or frame; a clamp adapted to hinge said sections or frames together and to determine the angle between said sections; hangers attached to the under side of the bumper of said car adapted to support the inner end of said primary frame; standards fixed to the upper side of said bumper; hooks mounted upon said standards; said hooks being adapted to support the inner end of said supplementary frame in such a manner that the supplementary frame is lifted out of said hooks and slides upon said standards when the primary section is raised in folding said sections together against said car.

Signed at New York, in the county of New York and State of New York, this 5th day of January, A. D. 1906.

RICHARDSON C. LAYTON.

Witnesses:
　JAMES W. McELHENNEY,
　FREDK. F. SCHUETZ.